UNITED STATES PATENT OFFICE.

FRANK S. WALTON, OF PHILADELPHIA, PENNSYLVANIA.

METHOD OR PROCESS OF TREATING AUTOMOBILE-TIRES AND THE INNER TUBES THEREOF.

1,223,302.　　　　　　Specification of Letters Patent.　　Patented Apr. 17, 1917.

No Drawing.　　　Application filed October 24, 1916.　Serial No. 127,461.

*To all whom it may concern:*

Be it known that I, FRANK S. WALTON, a citizen of the United States, residing in Philadelphia, Pennsylvania, have invented an Improved Method or Process of Treating Automobile-Tires and the Inner Tubes Thereof, of which the following is a specification.

My invention relates to the preservation of fibrous or fabric structures with which rubber or a rubber-containing material may or may not be combined; and one object of my invention is to provide a special method of treating automobile tire shoes of the usual type receiving an inner inflatable tube, (the walls of which tires are made up of a plurality of layers of fibers or fabric, rubber, and a cementitious body,) for the purpose of preserving the same against failure or blow-out due to the usual wear and tear to which they are subjected. A further object of my invention is to effect the preservation of the inner tubes of rubber employed with such tire shoes; the material employed for the purpose of preserving the tire shoes having a beneficial and preservative effect upon such inner rubber tubes.

It is well known, of course, that standard tires of present day manufacture have a substantially standard term of life or usefulness, and the practice of tire makers is to guarantee that such tires will not blow out or otherwise fail before running three-, four-, or five-thousand miles, as the case may be, depending upon the size, style and manner or method of construction.

Among the standard grades of tires, these guarantees are not only lived up to in the sense that tires that blow out or show other defects and therefore do not meet such guarantee are replaced and adjustments made, but the tires themselves are, in the majority of instances, actually good for the guaranteed mileage. After that mileage, however, the life of a tire is pretty well spent, and further use is at the discretion of the owner and with the clear understanding that a break may occur without warning.

I am not advised as to just what happens to the fabric in the carcass or body of the tire shoe and the actual reason for it giving way, although it can readily be understood that under the constant motion of the tire when in use, the strands of the fibers or fabric employed are being subjected to strains in all directions, with the result that sooner or later they give way and the tire breaks down. Such condition is recognized by all tire manufacturers, and constant efforts are directed toward the production of a tire that will avoid this defect. The usual methods, so far as I am advised, have been to increase the weight of the fabric employed or to so manipulate the strands or fibers making up the same as to increase their strength and reduce their liability to break under the usual wear and tear accompanying the conditions of use. In all probability, the breaking down of the fabric of a tire is due to friction of the strands or threads of the fibers or fabric employed, which are in constant motion when the tire is in use, due to the constant changing of the position of the same; such friction causing heat and rendering the strands and fibers of the fabric dry and brittle.

It is generally conceded that the fibers or strands of the fabric constituting the wall of the body or carcass of the tire shoe dry out, become broken, coarse in texture, and cause friction between the wall of the shoe and the inner tube. Such friction not only weakens the inner tube, but also the tire shoe and it eventually breaks; such rupture not being able to withstand the pressure of air within the inner tube, a "blow-out" occurs which destroys both inner tube and shoe.

These conditions have led me to the belief that if the individual strands or fibers of the fabric as well as the surface of the same were properly lubricated and made pliable, the tire shoe would be benefited and the life of such shoe would be materially increased. As the treatment I propose will require the application of the lubricating medium to the inner surface of the tire shoe, it will come in contact with the inner tube and the latter will also be benefited; the lubricant providing a protective layer or coating for the same which reduces the friction between the tube and the tire shoe. For the purpose of effecting such lubrication and creating pliability of the strands and fabric, I propose to employ an oleaginous body, preferably a thickened oil of animal origin. For this purpose I may employ animal oils, fats and greases, thickened and unthickened, and among those available for the purpose I may mention neat's-foot oil; sperm oil; whale oil; lard oil; cod oil; fish oil, &c., and, in fact, any non-drying or semi-drying oil of animal origin, or a combination of two or more of the same.

In carrying my invention into effect, I propose to treat new tires, as well as tires which have been in use, whether they have run the guaranteed mileage or not, and in practice I have treated tire shoes by applying approximately four ounces of an oleaginous body to the surface of the inner wall of the tire shoe.

A sufficient quantity of the material is applied to the inner wall of the tire shoe to not only permit it to penetrate each strand of the fabric comprising the wall of such tire shoe in order to preserve, lubricate and render pliable the same, but also enough to permit of the formation of a coating on the inner rubber tube, which coating glazes the inner tube and protects it from direct contact with the wall of the shoe; thus forming a friction-reducing film which acts as a lubricant and protector for both shoe and inner tube.

As illustrating the result of treating a tire according to my invention, I may say that I have taken a 34"x4½" tire of standard make, which was guaranteed to run thirty-five hundred (3500) miles without blow-out or defect. After running said tire thirty-nine hundred (3900) miles, I treated the same with an oleaginous body; about four ounces of thickened neat's-foot oil being applied to the surface of the inner wall of the shoe, and the original inner tube of rubber which had been placed in said tire shoe when the latter was first put into use was restored to place after the oil-treatment of said shoe. Following such treatment, the tire was run an additional seventeen hundred (1700) miles successfully and satisfactorily, or a total of fifty-six hundred (5600) miles, and with the original inner tube. Upon completing this mileage, the tire was treated to a second application of the neat's-foot oil. Upon the occasion of the second treatment, the inner tube was examined and found to be, apparently, in perfect condition and capable of further use.

At the time this tire was first treated, it exhibited external blisters, the exact character of which I was unable to determine, although they were not, as is commonly the case, filled with sand. The common understanding respecting blisters developing in automobile tires after use, is that their presence indicates a weakened condition and is followed in a very short while by a blowout and, in practice, tires which exhibit blisters are not considered to be good thereafter for more than two hundred (200) to four hundred (400) miles. Notwithstanding this condition, however, the tire which I treated after the same had run thirty-nine hundred (3900) miles and which at this stage of its life exhibited these blisters, has been run an additional thirty-one hundred (3100) miles, or a total of seven thousand (7000) miles, and is still capable of further use as soon as the external rubber tread is renewed.

While I am not specifically advised as to what actually occurs in the wall of the carcass or body of the shoe due to the oiling treatment, I believe that the application of oil or other oleaginous body thereto has had the effect of lubricating the fibers and strands of the fabric; rendering them pliable and providing them with a certain amount of elasticity, and destroying their tendency to break short. In any event this oiling treatment has materially extended the life of the tire shoe, and in addition the oil or oleaginous body employed forms a protective glaze or coating upon the outside of the inner tube, thereby extending its life.

I claim:

1. The process of treating automobile tires and inner tubes employed therewith, which comprises the application of an oleaginous animal product to the inner wall of the tire shoe with which the inner tube contacts for the impregnation of the shoe therewith and the surface coating of said inner tube.

2. The process of treating automobile tires and inner tubes employed therewith, which comprises the application of thickened neat's-foot oil to the inner wall of the tire shoe with which the inner tube contacts for the impregnation of the shoe therewith and the surface coating of said inner tube.

3. The combination with the shoe of an automobile tire and an inner tube employed therewith, of an oleaginous animal product interposed between said shoe and the inner tube and impregnating the body of said shoe.

4. The combination with the shoe of an automobile tire and an inner tube employed therewith, of a body or layer of a non-drying animal oil interposed between said shoe and the inner tube and impregnating the body of said shoe.

5. The combination with the shoe of an automobile tire and an inner tube employed therewith, of a body or layer of thickened neat's-foot oil interposed between said shoe and the inner tube and impregnating the body of said shoe.

FRANK S. WALTON.